Nov. 12, 1968 G. H. WOLF 3,410,513

DATA RECORDING ATTACHMENT FOR TELEPHONES

Filed July 13, 1966

INVENTOR

George H. Wolf

BY Clive H. Bramson

ATTORNEY

United States Patent Office 3,410,513

Patented Nov. 12, 1968

3,410,513 DATA RECORDING ATTACHMENT FOR TELEPHONES

George H. Wolf, 7 Gleeland St., Deer Park, N.Y. 11729

Filed July 13, 1966, Ser. No. 565,005
6 Claims. (Cl. 248—205)

ABSTRACT OF THE DISCLOSURE

A pad and index holding device for a telephone is provided for adhesive attachment to the planar side of the telephone. The device has three generally planar elements, the support carrying the adhesive for attachment to the telephone, a second planar element for retaining an index, and a planar jotting pad holding element. When not in use, the three elements are superimposed against the side of the phone and take up very little room, being maintained together by a pair of loops connected to the support which pass through apertures in the other two elements and through which a pencil passes in interlocking relationship.

This invention relates generally to attachments for telephone instruments and more particularly to a new and useful telephone attachment including card means upon which important data can be recorded for future reference and further including pad means upon which information may be written for temporary purposes.

Whereas the immediate availability of emergency or frequently called telephone numbers is always desirable and often necessary, the advantages of the present device will be readily appreciated. The device is adhesively attached to the side of the telephone and when not in use extends outwardly from the side of the telephone by only the thickness of the device. However, when in use the device is opened like a book to provide access to the interior thereof. The device is locked closed when not in use by a suitable pencil cooperating retaining means. Capable of being attached to almost any conventional telephone instrument without effectuating any modification to said instrument, the present attachment can be advantageously and momentarily installed to provide instant access to such important data.

Another object of the present invention is to provide a device of the foregoing character which is entirely foldable into parallelism with respect to the side of a telephone so as to be out of the way and inconspicuous when not in use.

A further object of this invention resides in the provision of a telephone data recording attachment which includes retention means for securing said attachment in the folded-away position, said retention means being adapted to coact with a writing implement in accomplishing the retention function and to at all times hold said writing implement for the convenience of the telephone user.

Another object of the present invention is to provide a device in accordance with the foregoing which includes adhesive means for the attachment thereof to a telephone.

Still another object of the instant invention is to provide a telephone number display card and a writing pad in slidably removable relation with a device which may be contoured to conform to the shape of the telephone.

Another general object of the present invention is to provide a device of the described character which will be simple in structure, economical of manufacture, easily and quickly installed and highly effective in use.

Other objects and advantages of the instant telephone instrument attachment will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate embodiments of the invention, and together with the description, serve to explain the principles of the invention.

Figures 1, 2, 3, 4, 5:
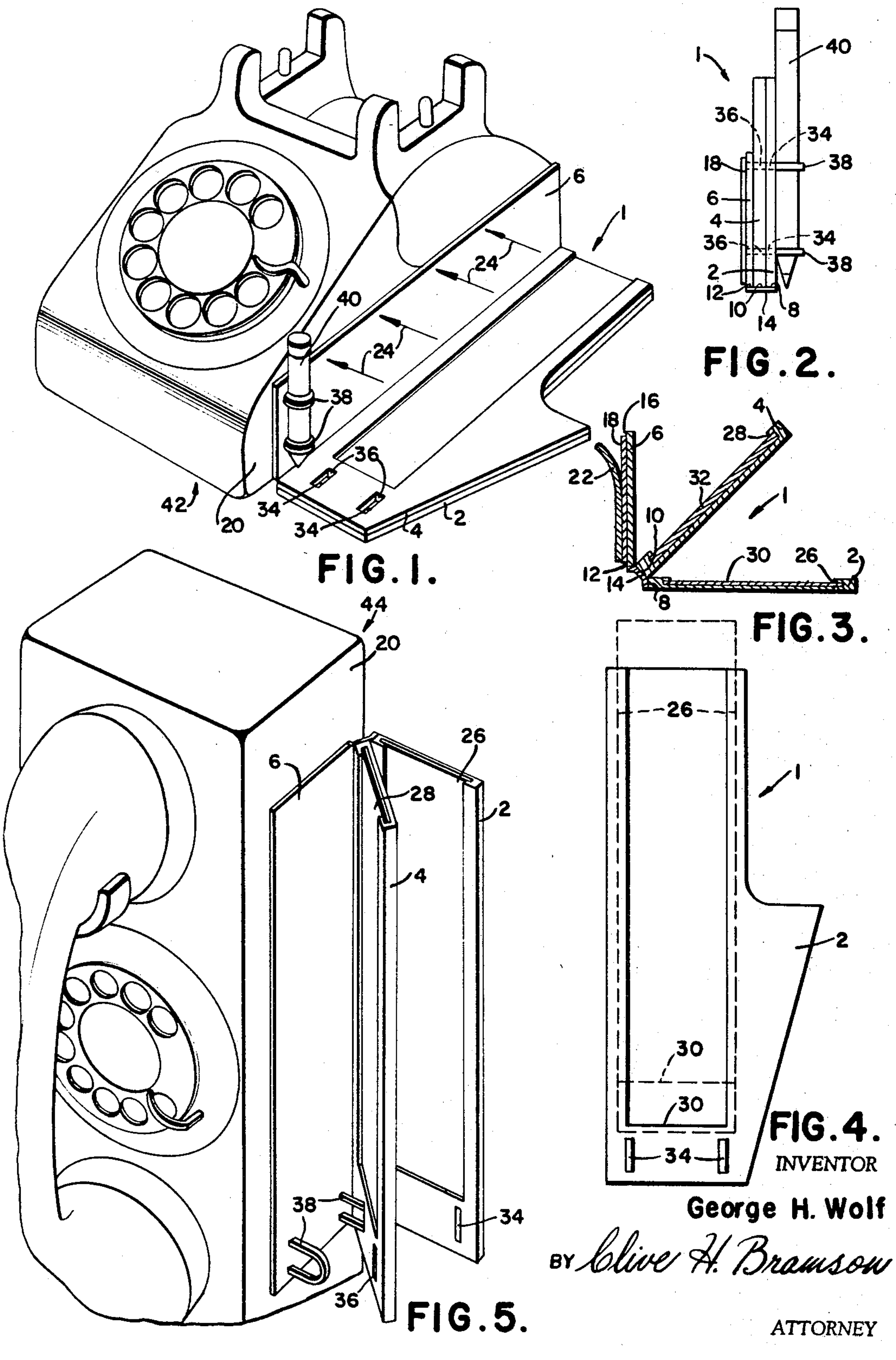
FIGURE 1 is a perspective view of a conventional table telephone and the data recording attachment secured thereto and shown in operable position.
FIGURE 2 is an end elevational view of the device in folded form prior to the securement thereof to the telephone instrument.
FIGURE 3 is an end cross-sectional elevational view of the device in open operable form.
FIGURE 4 is a plan view of the device illustrating the slidably receivable relationship of a data card with the channel means of the device.
FIGURE 5 is a perspecttive view of a modified form of the instant attachment secured to a wall-type telephone instrument.

Referring now in detail to the present preferred embodiment of the invention illustrated in the accompanying drawings, FIGURES 1–4 show the telephone attachment for a table-type telephone instrument designated generally by numeral 1 in the various positions as heretofore described.

More specifically, the attachment upon which data can be written and stored for future reference comprises an index card-holding member 2, a pad-holding member 4 and a support member 6, said members being hingedly connected along their longitudinal edges 8, 10 and 12, respectively, by a length of adhesive tape 14 as shown, or by any other suitable hinge-effectuating means.

Accordingly, said members 2 and 4 are capable of swinging from positions whereby they are at right angles with respect to said support member 6 is illustrated in FIGURE 1 or to positions of parallel superposition with respect to said support member as shown in FIGURE 2.

The reverse surface 16 of said support member is provided with an adhesive backing 18 whereby said support member can be directly and expediently fastened to a side 20 of a telephone instrument as shown in FIGURE 1 of the drawings. Said adhesive backing is, prior to being used as aforedescribed, protected by a removable covering 22, the latter being of paper or other suitable material which provides protection and maintains the adhesive backing in a fresh tacky condition between the period of manufacture and final application of the device to the telephone instrument. Thus, when it is desired to apply the device to the side 20 of the telephone instrument 42, covering 22 is stripped away from said support member 6 to thereby expose adhesive backing 18. With slight pressure applied against said support member 6 in the direction of arrows 24, the device 1 will remain attached to the telephone instrument as shown in FIGURE 1.

Channels 26 and 28 are provided integrally of members 2 and 4, respectively, said channels affording means wherein an index-type card 30 and a pad of paper sheets 32 can be removably received. Both the card and pad slidable into and out of their respective channels as typically shown in FIGURE 4 with respect to card-holding member 2 and index-type card 30.

To the end of retaining said support, card-holding and pad-holding members 2, 4 and 6 in parallel superposed relation as shown in FIGURE 2, and thereby in a space-saving and inconspicuous manner, pairs of slots 34 and 36 in said members 2 and 4, respectively, and looped post means 38 are cooperatively provided. Said post means 38 are perpendicularly connected to support member 6 and extend therefrom as shown in FIGURES 1 and 2 of the drawings. When said members are arranged in the parallel superposed relation, said post means are receivable through said respective slots which are in aligned registry as shown in FIGURE 2 and as partially shown in FIGURE 5, said latter figure illustrating a modification of the device which will be described hereinbelow following. In carrying out the cooperative retention function of said looped post means and said slots, an elongate element such as pencil 40 is receivable through said post means when the latter is received through said slots as shown in FIGURE 2. That is, a pencil, pen, or the like, inserted as shown through the loop-portions remaintaining after all members of the attachment are arranged in parallel superposed relation, will retain said members in such relation as shown in FIGURE 2. It will be further appreciated that where, as in FIGURE 1 of the drawings, members 2 and 4 are swung into perpendicularity with respect to member 6, a pencil may be held by said post means when there is no need for a writing implement. Similarly, it will be appreciated that the pencil may be held by the post means when only member 2 is arranged normally with respect to members 4 and 6 when only member 2 is being used for reference purposes.

In the embodiment shown in FIGURE 5, similar reference numerals are used to designate like parts of the embodiment illustrated in FIGURES 1–4. The modified attachment shown is essentially the same in all respects as the FIGURES 1–4 embodiment except that the configuration there of is preferably adaptable to a wall telephone 44 rather than a table telephone 42. Channel means 26 and 28 are similarly provided as are slots 34 and 36 and looped post means 38. Although not visible, adhesive backing 18 is similarly used to hold the telephone attachment to the side of wall telephone 44.

It will be understood that the invention contemplates the use of either or both of members 2 and 4 in combination with member 6. The device is preferably constructed of plastic with the card and pad inserts being of paper or other conventional material.

Although the preferred and modified embodiments of the data recording attachment for telephones have been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A device for written data for attachment to a telephone having a generally planar side surface, said device comprising:

a generally planar support member having an adhesive backing for adhesive attachment to the generally planar side surface of a telephone, said support member having a width not substantially greater than the width of the generally planar telephone side surface;

a generally planar data receiving member of approximately the same width and length as said support member being hingedly connected to said support member, said data receiving member being hingedly connected to said support member along their respective back edges, said data receiving member being adapted to swing about said hinged connection from a position of parallel superposition with said support member to a position generally perpendicular to said support member; and interlocking retention means for maintaining said generally planar data receiving member in parallel superposition with said generally planar support member, said retention means including a first part on said data receiving member and a second part on said support member, said first and second parts cooperating to interlockingly retain said data receiving member and said support member superimposed.

2. A device in accordance with claim 1 wherein said first part of said retention means comprises at least one slot extending through said data receiving member, and werein said second part comprises looped post means secured to and extending from said support member, said looped post means being complementary to and receivable through said slot when said data receiving member and said support member are superimposed, an elongate element being receivable through said looped post means to lock said data receiving member superimposed adjacent said support member.

3. A device in accordance with claim 2 including a pair of said looped post means and a pair of said complementary slots.

4. A device in accordance with claim 1, wherein said data receiving member includes a pair of channels near opposite edges thereof adapted to retain paper therein, and a second generally planar paper holding member hingedly connected to said first mentioned data receiving member and said support member along said hinged connection, said second generally planar paper holding member including a pair of paper-retaining channels near opposite edges thereof adapted to retain paper therein.

5. A device in accordance with claim 4 wherein said first part of said retention means comprises a slot extending through each of said paper holding members, and wherein said second part comprises looped post means secured to and extending from said support member, said looped post means being complementary to and receivable through said slots when said two paper holding members are superposed against said support member, and elongate element being receivable through said looped post means to maintain said generally planar members in superposed position.

6. A device in accordance with claim 4 wherein said paper-retaining channels are elongate in character and extend substantially the entire length of said generally planar paper holding members.

References Cited

UNITED STATES PATENTS

| | | | |
|---|---|---|---|
| 303,346 | 8/1884 | Vernon | 281—30 |
| 1,336,604 | 1/1921 | Shedd | 281—30 XR |
| 1,390,705 | 9/1921 | Hattersley | 40—336 XR |
| 2,541,270 | 2/1951 | Mitnick | 40—336 |
| 2,595,972 | 5/1952 | Naurison | 40—336 XR |
| 3,085,134 | 4/1963 | Bissonnette et al. | 179—146 |
| 3,102,739 | 9/1963 | Larson | 281—15 |

ROY D. FRAZIER, *Primary Examiner.*

R. P. SEITTER, *Assistant Examiner.*